United States Patent
Ozaki et al.

(10) Patent No.: US 9,776,885 B2
(45) Date of Patent: Oct. 3, 2017

(54) METHOD FOR PRODUCING HEMATITE FOR IRONMAKING

(71) Applicant: Sumitomo Metal Mining Co., Ltd., Tokyo (JP)

(72) Inventors: Yoshitomo Ozaki, Niihama (JP); Manabu Enomoto, Niihama (JP); Hirofumi Shouji, Niihama (JP); Tatsuya Higaki, Niihama (JP)

(73) Assignee: SUMITOMO METAL MINING CO., LTD., Minato-ku, Tokyo (JP)

( * ) Notice: Subject to any disclaimer, the term of this patent is extended or adjusted under 35 U.S.C. 154(b) by 169 days.

(21) Appl. No.: 14/386,445

(22) PCT Filed: Feb. 13, 2013

(86) PCT No.: PCT/JP2013/053411
§ 371 (c)(1),
(2) Date: Sep. 19, 2014

(87) PCT Pub. No.: WO2013/140900
PCT Pub. Date: Sep. 26, 2013

(65) Prior Publication Data
US 2015/0050201 A1    Feb. 19, 2015

(30) Foreign Application Priority Data

Mar. 21, 2012 (JP) ................. 2012-063596

(51) Int. Cl.
C01G 49/06 (2006.01)
B09B 3/00 (2006.01)
C22B 3/00 (2006.01)

(52) U.S. Cl.
CPC .......... *C01G 49/06* (2013.01); *B09B 3/00* (2013.01); *B09B 3/0083* (2013.01); *C22B 23/0415* (2013.01); *Y02P 10/212* (2015.11)

(58) Field of Classification Search
None
See application file for complete search history.

(56) References Cited

U.S. PATENT DOCUMENTS

2002/0041840 A1    4/2002  Arroyo et al.
2005/0226797 A1    10/2005 Liu et al.
(Continued)

FOREIGN PATENT DOCUMENTS

CA    2678724    3/2010
CN    1650038    8/2005
(Continued)

OTHER PUBLICATIONS

International Search Report dated May 14, 2013.
(Continued)

*Primary Examiner* — Melissa Swain
(74) *Attorney, Agent, or Firm* — Gerald E. Hespos; Michael J. Porco; Matthew T. Hespos

(57) ABSTRACT

Provided is a production method for refining iron oxide (hematite), which has such a low sulfur content as to be used as an iron-making raw material, from a leach residue containing iron oxide produced by a high pressure acid leach (HPAL) process. In the method for refining iron oxide for ironmaking by a process of adding sulfuric acid to nickel oxide ore and then leaching nickel from the nickel oxide ore using a pressure vessel, an amount of the sulfuric acid added is 150 kg or more and 220 kg or less per ton of nickel oxide ore.

9 Claims, 2 Drawing Sheets

(56) References Cited

U.S. PATENT DOCUMENTS

| | | |
|---|---|---|
| 2007/0295613 A1 | 12/2007 | Moyes et al. |
| 2008/0053276 A1 | 3/2008 | Liu et al. |
| 2008/0138263 A1 | 6/2008 | Liu |
| 2008/0286182 A1 | 11/2008 | Costa et al. |
| 2010/0150799 A1* | 6/2010 | Boudreault ............... C01F 7/22 423/112 |
| 2011/0056333 A1 | 3/2011 | Liu et al. |
| 2011/0135547 A1* | 6/2011 | Kobayashi ........... C01G 51/003 423/139 |

FOREIGN PATENT DOCUMENTS

| | | |
|---|---|---|
| CN | 1938436 | 3/2007 |
| CN | 101072885 | 11/2007 |
| CN | 101768665 | 7/2010 |
| CN | 101978080 | 2/2011 |
| JP | 3-176081 | 7/1991 |
| JP | 2010-95788 | 4/2010 |
| JP | WO 2012014685 A1 * | 2/2012 ........... C22B 3/0005 |
| WO | 2006084335 | 8/2006 |
| WO | 2006119559 | 11/2006 |
| WO | 2007053919 | 5/2007 |
| WO | 2007095689 | 8/2007 |

OTHER PUBLICATIONS

Second Office Action Dated Dec. 22, 2015.
Sulpuric Acid Pressure Leaching of a Limonitic Laterite: Chemistry and Kenetics Accepted Mar. 2, 1995.
Sulphuric Acid Pressure Leaching of Laterites—Universal Kinetics of Nickel Dissolution for Limonites and Limonitic/Saprolitic Blends Accepted Mar. 29, 2000.
Chinese Patent Appl. No. 201380015135.9—Office Action issued Apr. 29, 2015.
"Progress on High Pressure Acid Leaching of Nickel Laterites", Beijing General Research Institute of Mining & Metallurgy Beijing 100070 China.

* cited by examiner

METHOD FOR PRODUCING HEMATITE FOR IRONMAKING

BACKGROUND

1. Field of the Invention

The present invention relates to a production method for refining a leach residue obtained by hydrometallurgical refining of nickel oxide ore into hematite that can be used as an iron-making raw material and has a low sulfur content.

2. Description of the Related Art

In steel smelting, a method of charging iron ore containing iron oxide into a blast furnace along with a reductant such as coke, heating and melting the iron ore under a reducing atmosphere to obtain crude steel, and refining the crude steel in a converter to obtain desired steel has been used.

The iron oxide that is a raw material of the steel is a limited resource, and furthermore it is gradually hard to obtain high-quality iron ore required to maintain a quality of steel.

Meanwhile, with respect to nickel becoming a raw material of stainless steel, technology for smelting low-grade oxide ore as a raw material due to a tendency toward resource exhaustion of sulfide ore that has been used in the past has been developed and put to practical use.

To be specific, nickel oxide ore such as limonite or saprolite is put into a pressure device such as an autoclave along with a sulfuric acid, and nickel is leached under high pressure and high temperature of about 240 to 260° C.

The nickel leached into a solution of the sulfuric acid is used as nickel metal or a nickel salt compound by separating from a leach residue by solid-liquid separation, separating impurities to recover the leach residue as an intermediate raw material in the form of hydroxide or sulfide, and further refining the intermediate raw material.

In such a process called high pressure acid leach (HPAL), nickel can be almost completely leached even from low-grade ore in which valuable metals intended for recovery are contained by not more than 1% to 2% by weight (hereinafter indicated by "%" with regard to a grade). Further, the HPAL process has a feature of concentrating the valuable metals up to the same grade as a conventional raw material by producing an intermediate raw material from a leachate, and refining the nickel in a process similar to a conventional process.

Further, the HPAL process may be applied to various types of ores such as nickel sulfide ore, copper sulfide ore, and copper oxide ore, in addition to the nickel oxide ore.

Further, a main component of the leach residue obtained by the HPAL process is iron oxide having the form of hematite. This is secondarily obtained because each of oxide ore and sulfide ore of nickel or copper used as a raw material contains iron of an amount far more than a content of nickel or copper.

These leach residues are created at a high temperature, and thus have the form of oxide that is chemically or environmentally stable. However, the leach residues have no special utility value, and have been scrapped to a residue disposal yard. For this reason, it has been a grave challenge how to secure the disposal yards for an enormous amount of leach residues generated along with the smelting.

Furthermore, the leach residue of the HPAL process cannot be directly used as the aforementioned iron-making raw material. The reason is that the leach residue of the HPAL process contains gangue and impurities, particularly sulfur, in addition to the iron oxide and requires exhaust gas treatment, and thus is not suitable for the raw material used in the conventional iron-making process in common.

Particularly, a grade of the sulfur in iron oxide usable for the iron-making raw material differs depending on facility capacity and an amount of production of individual ironworks, and generally needs to be suppressed to 1% or less.

For this reason, a method of separating such sulfur from the leach residue has been attempted.

As one of specific methods, a method of separating sulfur using a pressure device such as an autoclave is also known.

For example, JP H03-176081 discloses a method that includes stirring a jarosite-containing residual and a zinc sulfide inclusion in an autoclave at least under oxygen partial pressure of 1000 kPa at a temperature of 130 to 170° C. along with a free sulfuric acid of 40 to 100 g/l, substantially dissolving iron and zinc fractions of a concentrate containing the residual and zinc sulfide, introducing the solution into a leach circulation passage for zinc electrolysis to settle iron in the form of hematite, and separating sulfur from the above solid, and supplying the residual for separate application.

However, this method has problems that an expensive device such as an autoclave is required, that a facility investment is increased, and that an operation is complicated.

As described above, it is difficult to avoid the mixing of sulfur caused by neutralization. Thus, it is difficult to process a leach residue generated by the HPAL process into hematite and to use the hematite as the iron-making raw material.

The present invention is intended to provide a production method for refining hematite, which has such a low sulfur component as to be used as an iron-making raw material, from a leach residue containing iron oxide produced by a high pressure acid leach (HPAL) process.

SUMMARY OF THE INVENTION

To solve the above problems, a first aspect of the present invention provides a method for refining iron oxide for ironmaking by a process of adding sulfuric acid to nickel oxide ore and then leaching nickel from the nickel oxide ore using a pressure vessel, wherein an amount of the sulfuric acid added is 150 kg or more and 220 kg or less per ton of the nickel oxide ore.

A second aspect of the present invention provides a method for refining iron oxide for ironmaking by a process of adding sulfuric acid to nickel oxide ore and then leaching nickel from the nickel oxide ore using a pressure vessel, wherein a chloride is also added to the nickel oxide ore, not only the sulfuric acid.

A third aspect of the present invention according to the first and second aspects, the method for refining iron oxide for ironmaking is characterized in that the leach residue obtained after the leaching of nickel is washed with an alkali solution having a concentration of 20% by weight or more.

The present invention can bring about the following industrial significant effects:

(1) It is possible to easily obtain hematite that has low-grade sulfur and can be used as an iron-making raw material;

(2) The iron-making raw material can be cheaply and stably procured;

(3) Wastes such as a leach residue discharged in a refining process can be used as the iron-making raw material, and it is thus possible to remarkably reduce an amount of the scrapped leach residue and further reduce production costs by lowering an environmental risk, reducing scrapping costs, and reducing construction costs of a leach residue disposal yard; and (4) When hematite with the low-grade sulfur is produced, a special facility is not required, and thus establishment of its producing process is easy.

DETAILED DESCRIPTION

The present invention is to efficiently produce high-purity hematite (iron oxide) by reducing a concentration of sulfuric acid to be added while maintaining a range of the concentration of sulfuric so as not to cause a leach rate of nickel to be reduced when a mineral such as nickel oxide ore containing valuable metals and iron is subjected to high-pressure sulfuric acid leach, and further washing a leach residue with an alkaline solution having a concentration of 20% by weight or more, so that a sulfur content in the leach residue is reduced to such an extent that the hematite can be used as an iron-making raw material.

The inventors observed an existence form of the sulfur in the leach residue in a cross section using an analyzer, and found out that most of the sulfur coexisted with iron and took the form of butter rock (jarosite).

The sulfur existing as the jarosite form can be usually decomposed at a temperature of 700° C. or more as described in Patent Document 1. However, facility and heating costs are not negligible.

Therefore, the inventors discovered that the sulfur could be inhibited from being contained in the leach residue by operating on the condition that the leach residue did not generate the jarosite, further found out that, although the sulfur was partly contained, the sulfur could be decomposed by post-treatment, and reached completion of the present invention.

Figure 1:
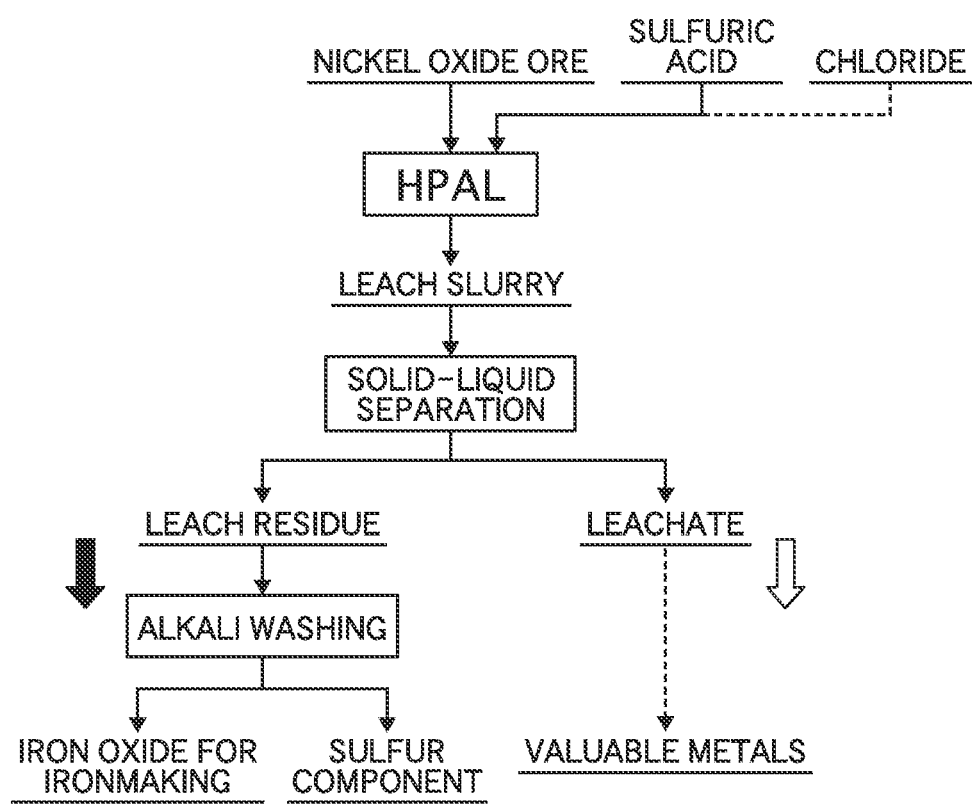
FIG. 1 is a flow chart showing a recovery process of performing high-pressure sulfuric acid leach on a mineral containing valuable metals and iron to recover the valuable metals, and further showing refining process of iron oxide (hematite) for iron-making use having low-grade sulfur in association with the recovery process.

FIG. 1 illustrates a representative flow for a recovery process of performing high-pressure sulfuric acid leach on a mineral, such as nickel oxide ore, containing valuable metals and iron to recover the valuable metals, and a further flow for a refining process of producing hematite having low-grade sulfur from a leach residue obtained in association with the recovery process, according to the present invention.

The flow for the recovery process of the valuable metals is indicated by an outline arrow, and the flow for the refining process of the iron oxide (low-grade sulfur-containing hematite) for iron-making use according to the invention is indicated by a black arrow.

First, in the case of sulfuric acid to be added when nickel oxide ore is subjected to the high-pressure sulfuric acid leach, 250 kg or more of sulfuric acid per ton of nickel oxide ore has been added in order to obtain a leach rate of 95% or more that has been considered to be industrially practical. At this time, the sulfur grade in the leach residue was about 1.2 to 2%.

As the addition amount of the sulfuric acid is reduced, the leach rate of nickel may also be reduced, and thus extreme reduction has been avoided. However, the inventors found out that the grade of sulfur in the leach residue was lowered by reducing the sulfuric acid added in leaching.

If a concentration of the sulfuric acid is in a range from about 200 kg to 220 kg per ton of ore, the leach rate of nickel can also usually maintain 95% or more, and both securing the nickel leach rate and reducing the sulfur of the leach residue can be achieved.

Further, a way of increasing an oxidant, such as air or oxygen, to be added along with the sulfuric acid in leaching shows little effect in reducing the grade of sulfur in the leach residue. However, even when a chloride, such as sodium chloride or potassium chloride, is added along with the sulfuric acid in leaching, an effect of reducing the sulfur content is obtained.

An amount of the chloride added is, for instance, an amount corresponding to a molar ratio of about four times the sulfur contained in the leach residue, and thereby the sulfur grade of the leach residue is less than 1%.

As the chloride to be used, materials other than calcium chlorides, such as sodium chloride, potassium chloride, and magnesium chloride, are suitable.

Further, when an amount of a sulfuric acid added in leaching of nickel is reduced to perform the leaching or when the chloride is further added besides the sulfuric acid according to the invention, a leach residue thus obtained is subjected to alkali washing by an alkaline solution. Even so, the sulfur component in the leach residue can be removed, and the leach residue having low-grade sulfur can be obtained.

The alkali to be used is preferably alkali other than calcium series. Sodium hydroxide is readily available, and is also preferable from the price aspect.

The alkaline solution used for washing preferably has an alkali concentration of at least 20% by weight to make sulfur grade of the leach residue less than 1%, and a washing time thereof is preferably at least two hours at an alkali concentration that is not less than 20% by weight.

EXAMPLES

Hereinafter, the invention will be described in detail using examples.

Example 1

Nickel oxide ore having 1% nickel grade and 46 to 48% iron grade was adjusted to be a slurry of 30 to 40% by weight, and then sulfuric acid of 64% by weight was mixed to be 205 kg per ton of ore (205 kg/ore-t), which was smaller than that applied conventionally.

Subsequently, the mixed slurry was charged into a pressure device, heated to 240 to 250° C., and then held for three hours, and nickel in the ore was leached to form a leach slurry.

Next, solid-liquid separation was directly performed using Nutsche and a filtering bottle, and the leach slurry was separated into a leachate and a leach residue.

Table 1 shows an addition amount of sulfuric acid per ton of ore [kg/ore-t], a free acid concentration prior to the solid-liquid separation (represented as a slurry free acid concentration "g/l"), an amount of the sulfur component contained in the leach residue [% by weight] (represented as sulfur grade in residue [%]), and a Ni leach rate [%] calculated from an amount of Ni contained in the leachate after the solid-liquid separation.

Example 2

Example 2 was performed in the same way as Example 1, except that sulfuric acid added to nickel oxide ore was mixed to be 165 kg per ton of ore (165 kg/ore-t), and the sulfuric acid was subjected to solid-liquid separation into a leachate and a leach residue.

At this time, an addition amount of sulfuric acid per ton of ore, a free acid concentration prior to the solid-liquid separation (slurry free acid concentration), an amount of the sulfur component contained in the leach residue (sulfur grade in residue), and a Ni leach rate calculated from an amount of Ni contained in the leachate after the solid-liquid separation are shown in Table 1 together.

Conventional Example

Conventional Example was performed in the same way as Example 1, except that sulfuric acid added to nickel oxide ore was mixed to be 275 kg per ton of ore (275 kg/ore-t) which was in a conventional range, and the sulfuric acid was subjected to solid-liquid separation into a leachate and a leach residue.

At this time, an addition amount of sulfuric acid per ton of ore, a free acid concentration prior to the solid-liquid separation (slurry free acid concentration), an amount of the sulfur component contained in the leach residue (sulfur grade in residue), and a Ni leach rate calculated from an amount of Ni contained in the leachate after the solid-liquid separation are shown in Table 1 together.

TABLE 1

| | Sulfur acid addition amount [Kg/ore-t] | Slurry free acid [g/l] | Sulfur grade in residue [%] | Ni leach rate [%] |
|---|---|---|---|---|
| Conventional Example | 275 | 29.8 | 1.2 | 97.0 |
| Example 1 | 205 | 16.2 | 1.0 | 96.2 |
| Example 2 | 165 | 15.0 | 0.83 | 85.5 |

Figure 2:
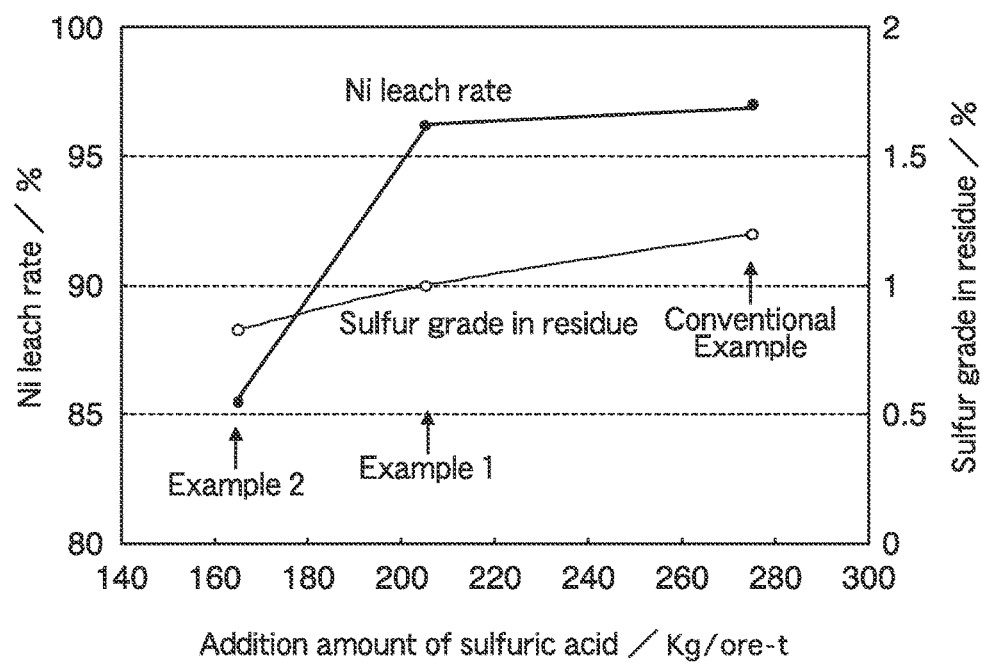
FIG. 2 is a diagram illustrating a change in a sulfur grade in residue and a leach rate of Ni with regard to an addition amount of sulfuric acid in Examples 1 and 2 and Conventional Example.

FIG. 2 illustrates a change in sulfur grade in residue and a leach rate of Ni with regard to an addition amount of sulfuric acid in Examples 1 and 2 and Conventional example.

As is obvious from Table 1 and FIG. 2, in comparison with the conventional case of the sulfuric acid addition amount of 275 kg per ton of ore, the addition amount of 205 kg (Example 1) enables the sulfur in the residue to be reduced to 1% without substantially reducing the Ni leach rate. Further, the addition amount of 165 kg (Example 2) enables the sulfur in the residue to be reduced to 0.83%, but the Ni leach rate is also reduced to 85.5%. As such, when there is an intention to obtain iron oxide (hematite) with low-grade sulfur while the Ni leach rate is focused (i.e., is not reduced), the addition amount of the sulfuric acid is not more than 220 kg per ton of ore, and more preferably not more than 205 kg.

Further, when iron oxide (hematite) with lower-grade sulfur is desired, leaching is made possible by a smaller amount of sulfuric acid. However, when a Ni leach rate is set to about 85% in consideration of production efficiency, the addition amount of the sulfuric acid is allowable up to 150 kg/ore-t. In that case, the sulfur content of the obtained leach residue can be expected up to about 0.5%.

Example 3

In Example 1, an addition amount of sulfuric acid was set to 275 kg per ton of ore, and further magnesium chloride (MgCl2) was added to be a concentration of 14.3 g/l. The other conditions were the same as those of the Example 1. As such, Example 3 was performed and separated into a leachate and a leach residue, and the sulfur grade in the leach residue was measured.

As a result, due to the addition of the chloride, even though the added sulfuric acid was the same amount (275 kg/ore-t) as the case of Conventional Example shown in Table 1, the sulfur grade in the leach residue could be reduced to 0.99% without substantially changing the Ni leach rate.

Example 4

Effect of Alkali Washing

A leach residue, which was leached in the same way as Example 1 above and was adjusted such that the sulfur grade in the leach residue was 1.3% by weight, was separated and washed by adding an alkaline solution such that a slurry concentration was 5% by weight.

Sodium hydroxide having an alkali concentration of 20% by weight was used as the alkaline solution added, and was stirred for two hours while being maintained at 60° C. After being stirred, the alkaline solution was subjected to solid-liquid separation using Nutsche and filter paper, and then the leach residue after the alkali washing was washed by spraying pure water.

A sulfur grade in the obtained leach residue was measured, and is shown in Table 2.

Example 5

Example 5 was performed in the same way of Example 4 except that an alkali concentration was 30% by weight. A leach residue was subjected to alkali washing, and was then washed with pure water. A sulfur content in the obtained leach residue was measured, and is shown in Table 2.

Example 6

Example 6 was performed in the same way of Example 4 except that an alkali concentration was 30% by weight and a washing time for alkali washing of a leach residue was set to four hours. The leach residue was subjected to the alkali washing, and was then washed with pure water. A sulfur content in the obtained leach residue was measured, and is shown in Table 2.

Comparative Example 1

Comparative Example 1 was performed in the same way of Example 4 except that an alkali concentration was 0.04% by weight and a washing time for alkali washing of a leach residue was set to two hours. The leach residue was subjected to the alkali washing, and was then washed with pure water. A sulfur content in the obtained leach residue was measured, and is shown in Table 2.

Comparative Example 2

Comparative Example 2 was performed in the same way of Comparative Example 1 except that a washing time for alkali washing of a leach residue was set to five hours. The leach residue was subjected to the alkali washing, and was then washed with pure water. A sulfur content in the obtained leach residue was measured, and is shown in Table 2.

TABLE 2

|  | Alkali concentration of washing solution | Washing time [hr] | Sulfur grade in Leach residue [%] |
| --- | --- | --- | --- |
| — | Before washing | — | 1.30 |
| Example 4 | 20% by weight | 2 | 0.89 |
| Example 5 | 30% by weight | 2 | 0.90 |
| Example 6 | 30% by weight | 4 | 0.86 |
| Comparative Example 1 | 0.04% by weight | 2 | 1.31 |
| Comparative Example 2 | 0.04% by weight | 5 | 1.29 |

As is obvious from Table 2, it is found that the sulfur in the leach residue can be effectively reduced to less than 1% by using the alkali having a concentration of 20% by weight.

When the alkali concentration is low, the reduction of sulfur grade in the leach residue does not occur even though the washing time is prolonged, and the sulfur grade in the leach residue of less than 1% is not achieved, as described in Comparative Examples 1 and 2.

The invention claimed is:

1. A method of refining iron oxide for ironmaking from a leach residue, the method comprising:
    adding sulfuric acid to nickel oxide ore that includes iron;
    leaching nickel from the nickel oxide ore using a pressure vessel and forming a leach slurry, and then
    solid-liquid separating the leach slurry to provide the leach residue that includes hematite and a nickel containing leachate,
    wherein an amount of the sulfuric acid added is 150 kg to 205 kg per ton of the nickel oxide ore wherein the addition provides 96 kg to 131.2 kg $H_2SO_4$ per ton of the nickel oxide ore, and
    wherein a sulfur grade of the leach residue is 1 wt.% or less.

2. The method of claim 1 further comprising:
    adding a chloride to the nickel oxide ore along with the sulfuric acid.

3. The method of claim 2, further comprising washing the leach residue with an alkali solution having a concentration of 20% by weight or more.

4. The method of claim 1, further comprising washing the leach residue with an alkali solution having a concentration of 20% by weight or more.

5. The method of claim 2, wherein the chloride is selected from calcium chloride, sodium chloride, potassium chloride, and magnesium chloride.

6. The method of claim 5, wherein the chloride is magnesium chloride.

7. The method of claim 2, wherein the chloride is added in an amount corresponding to a molar ratio of about 4 times the sulfur contained in the leach residue.

8. A method of refining iron oxide for ironmaking from a leach residue, the method comprising:
    adding sulfuric acid to nickel oxide ore which includes iron;
    leaching nickel from the nickel oxide ore using a pressure vessel and forming a leach slurry, and then
    solid-liquid separating the leach slurry to provide the leach residue which includes hematite and a nickel containing leachate,
    wherein an amount of the sulfuric acid added is 150 kg to 205 kg per ton of the nickel oxide ore wherein the addition provides 979 to 1338 moles $H_2SO_4$ per ton of the nickel oxide ore, and
    wherein a sulfur grade of the leach residue is 1 wt.% or less.

9. A method of refining iron oxide for ironmaking from a leach residue, the method comprising:
    adding 64% sulfuric acid to nickel oxide ore which includes iron;
    leaching nickel from the nickel oxide ore using a pressure vessel and forming a leach slurry, and then
    solid-liquid separating the leach slurry to provide the leach residue which includes hematite and a nickel containing leachate,
    wherein an amount of the sulfuric acid added is 150 kg to 205 kg per ton of the nickel oxide ore, and wherein a sulfur grade of the leach residue is 1 wt.% or less.

* * * * *